US008423489B2

(12) United States Patent
Johnson et al.

(10) Patent No.: US 8,423,489 B2
(45) Date of Patent: Apr. 16, 2013

(54) METHOD FOR CREATING ASSOCIATION INDEX FOR THE ANALYSIS OF DOCUMENTS CLASSIFIED IN A HIERARCHICAL STRUCTURE USING FREQUENCY DISTRIBUTION, A TAXONOMIC STRUCTURE, NORMALIZING AND WEIGHTING

(75) Inventors: Aaron R. Johnson, Louisville, KY (US); Robert W. Fletcher, Louisville, KY (US)

(73) Assignee: Intellectual Property Control Corp., Louisville, KY (US)

( * ) Notice: Subject to any disclaimer, the term of this patent is extended or adjusted under 35 U.S.C. 154(b) by 293 days.

(21) Appl. No.: 12/800,648

(22) Filed: May 20, 2010

(65) Prior Publication Data

US 2011/0289040 A1    Nov. 24, 2011

(51) Int. Cl.
*G06E 1/00*  (2006.01)

(52) U.S. Cl.
USPC ............................................. 706/20

(58) Field of Classification Search ................... 706/12, 706/20, 45, 62; 705/310
See application file for complete search history.

*Primary Examiner* — David Vincent

(57) ABSTRACT

The present invention is a computer-enabled method for combining information stored in a hierarchical classification structure, such as the International Patent Classification system, with the frequency of events resulting from human decision processes in order to generate an association index for a patent classification. The association index can then be used to quickly analyze a portfolio of patents.

1 Claim, 3 Drawing Sheets

METHOD FOR CREATING ASSOCIATION INDEX FOR THE ANALYSIS OF DOCUMENTS CLASSIFIED IN A HIERARCHICAL STRUCTURE USING FREQUENCY DISTRIBUTION, A TAXONOMIC STRUCTURE, NORMALIZING AND WEIGHTING

BACKGROUND OF THE INVENTION

The analysis and management of risk as it relates to intellectual property is hampered by a paucity of sophisticated analytical tools. In the analysis of large portfolios of patents, practitioners often find great difficulty in reordering and filtering the portfolio so that the most relevant patents are brought to prominence, while the visibility of less relevant patents is diminished. One reason for the lack of sophisticated tools has been the industry's reliance on purely objective algorithms for the constitution of analytical tools. For example, Boolean searches test for the presence or absence of a set of words. Semantic searches test for a statistical distribution of words. Searches based on patent classification test for matching nomenclature. A more sophisticated approach would take in to account that by the time a practitioner conducts his or her analysis, a portfolio of patents has already been imbued with information resulting from a number of analytical decisions already made. This latent intelligence is encoded in the patent's classification, litigation history, ownership, and other events as will be described in the specification below.

For example, (1) a patent examiner has classified the subject matter of the patent using the hierarchical and information-laden International Patent Classification system (IPC). (2) Assignees of similar patents have decided to (or decided not to) pursue litigation based on the perceived value of subject matter. (3) Inventors have made a decision to patent within a particular subject area. (4) Inventors have referenced patents in other classifications within their applications. (5) Similarly, patent examiners have made decisions to cite patents within other classifications. (6) Purchasers of patents or portfolios have placed a dollar-value on patents of a particular subject matter. (7) Assignees of patents have made decisions to pay maintenance fees on patents within various classifications, some classifications perhaps more frequently than others.

In each of the above examples and in relation to other events described below, a knowledgeable individual has assessed not only the patent in question, but the subject matter to which the patent belongs. An improved set of analytical tools would make use of the latent intelligence created by these decisions. One reason for the lack of such analytical tools is that the art has, up to this point, lacked a technique for relating these decisions to one another and to the underlying subject matter. This is true despite the fact that several hierarchical classification systems have been developed for the patent system with the expressed purpose of relating specific documents to an underlying subject matter.

The present invention seeks to remedy these shortcomings by providing a method to utilize the structure of a hierarchical classification system in conjunction with the recorded and quantifiable decisions of previous individuals involved with the collective body of patents to improve the efficacy of analysis of a patent or portfolio of patents.

Hierarchical Classification System

The need for a tree-like, hierarchical taxonomical structure arises from the need to relate document of a particular subject matter to similar document and to other media within that subject matter. The tree structure is advantageous because it provides the classifier with a structured approach to the difficult task of classifying documents. Such a structure stretches the classifying decision out over several smaller, and hopefully easier, classification decisions. As such, the structure of the hierarchical classification system must be determined prior to any classification. Thus, if used properly the hierarchical classification system already conveys a tremendous amount of latent intelligence to the process of analyzing patents.

A tree-like hierarchical classification system defines a set of relationships between nodes of the tree. A node is a point of data within the structure. Each node represents a distinct and unique category. A tree structure is organized such that each node has a single "parent" node and zero or more "child" nodes. A parent node contains, or is a superclass of a child node. "Sibling" nodes have the same parent node. An "ancestor" is any node connected to a lower-level node. The topmost node is often referred to as the tree "root" and has no parent node. "Leaf" nodes are the bottom-most nodes and have no child nodes. Trees are hierarchical structures and may be considered in terms of "levels" of the tree wherein the root node forms the highest level, the children of the root form the next level, and so on.

A hierarchical classification system defines a decision tree for the classifier wherein the classifier, at each node in the decision, assigns to the subject matter one of a limited number of categories corresponding to each of the child nodes of the node. The next classifying decision is based on the child nodes of the selected node, if any exist. Early in the decision process (at the top nodes of the tree), the categories describe broad subject matter. At each subsequent level, the available categories become narrower in scope and further refine the classification of the ancestor nodes. The classification is complete when the classifier has reached a predetermined degree of specificity—usually known by the number of levels through which the decision process has traversed. In this manner, a hierarchical classification system will divide subject matter in to distinct groups in a stepwise fashion.

A hierarchical classification system is particularly useful in the analysis of patents because, in addition to providing a convenient means of classifying patentable material in to distinct groups, the taxonomic structure encapsulates information about the relationships between patent classes. For instance, patents in two different classifications which share an ancestor only one level above are more alike than those whose first common ancestor is closer to the root of the tree. This is intuitively similar to the commonplace understanding of the similarity between patentable subjects. For example, an invention claiming a method of polymerizing organic molecules has greater similarity to an invention claiming a method of inorganic synthesis than it does to an invention claiming a method of manufacturing an engine block. This idea of similarity, based on a classification's position within the tree structure, is a greatly underused advantage of a hierarchical classification system.

Thus, such classification systems which encapsulate the collective, thoughtful and intelligent input of skilled persons, capture and transmit a tremendous quantity of information about patents within its structure alone. In particular, they embody decisions made by informed examiners with expertise in the hierarchical classifying system to assign a patent to a particular classification. The present invention seeks to make maximal use of the information in that decision, transmitted by the assignment of a patent to a patent class, to quickly rank and qualify a patent during analysis. One hierarchical classification system, the International Patent Classification (IPC) is very useful in this endeavor. While, slightly more complex than the ideal tree structure described above, the IPC is a convenient and widely used hierarchical classification system for patents and will be used in the forgoing discussion of the present invention so to provide a concrete example of how the present invention could be implemented. Of course, the IPC is not necessary for this invention. Any hierarchical classifying system may be used. The IPC, however, is convenient in that it is widely employed and supported internationally and is under active development.

The latest intelligence of the IPC and other like complicated systems or collections of decisions can be mined to create a heuristic rule system which enables the user, using a computer, to determine the relationships between the levels of the taxonomy which are the collective, latent intelligence of hundreds of not thousands of individuals.

International Patent Classification (IPC)

In the IPC, high-level nodes represent broad categorizations of patentable subject matter. Child nodes always represent categorizations which are narrower in scope than categorization of their parent node. By doing so, an examiner may classify the subject matter of a document in a stepwise fashion, assigning a broad category to the subject matter, followed by a narrower child classification, and so on until a complete class symbol has been constructed.

In the IPC, the layers are given the names: Section, Class, Subclass, Group, and Main/Sub group. At each level of classification, the examiner adds the symbol of the node to the burgeoning class symbol. The section symbol is a letter from A ("Human Necessities") to H ("Electricity"). The Class symbol is a two-digit number. The subclass is a letter. Groups are given a 1-3 digit number while the main/subgroup is assigned a number of at least two digits. If this final symbol is '00' then the group is considered a main group. With any other number, it is a subgroup.

The combination of all these symbols represents a complete classification. For example, in the classification A61B 18/00, 'A' represents the 'Human Necessities' section. 'A61' represents the "Medical or Veterinary Science; Hygiene" class. 'A61B' refers to the "Diagnosis; Surgery; Identification" subclass. And the entire symbol represents the classification "Surgical instruments, devices or methods for transferring non-mechanical forms of energy to or from the body." The '00' means this is a main group.

At first glance, it appears that there are only five layers in this tree structure. The IPC, however, is a complicated system and the logical relationship between main groups and subgroups does not necessarily match what is textually suggested by the complete classification symbol. Unlike Section, Classes, and Subclasses whose symbols do not represent complete classification symbols, main and subgroups do represent complete symbols AND can be parents and/or ancestors of a plurality of subgroups. This relationship is not reflected in the complete classification symbol, but can be deciphered from the number of stars preceding the title text of the subgroup. For example, a subclass with three stars before its title text is a child of the closest two-star subclass with a lesser subgroup number.

For a more complete description of the IPC, please see the IPC documentation at http://www.wipo.int/classifications/en/.

SUMMARY OF THE INVENTION

The present invention uses the structure codified in a hierarchical classification system to distribute a measure of the probability of unary and binary events among the hierarchical layers of a tree-like taxonomic system, as illustrated in FIG. 1, and by doing so, allows knowledge of one patent class to inform a practitioner's understanding of another patent class. By formalizing a method of spreading knowledge of one patent classification to other classes an association index can be determined. An association index for each patent classification (for unary events) or for each pair of paten classifications (for binary events) is the end result of the method embodied by this invention. The association index is not strictly proportional to the number of events related to the patent class in question, but is also partially proportional to a plurality of related patent classes.

Unary Event

A unary event is any action-related datum resulting from a human decision and comprehensible without reference to any other event. For example, the decision to file a patent (which is eventually assigned a classification) gives rise to a unary event. The number of patent filings within a patent class provides a metric for the en masse results of a wide range of business, scientific and financial decisions made by inventors. So, by tallying the number of patent filings within each patent class, a practitioner could construct the frequency distribution of the unary event: patent filing. As another example, the decision to file a suit alleging infringement of a patent is a unary event. Thus, tallying the number of times a patent of a particular class is asserted in court would yield the frequency distribution of the unary event: patent litigation. As another example, a practitioner could calculate the number of times a patent in a particular class is offered for sale in an auction.

Binary Event

A binary event is any patent-related datum resulting from a human decision and comprehensible only with reference to itself and one other event. For example the assignment of a patent into multiple classifications gives rise to a binary event because a practitioner can analyze the frequency with which two classifications are assigned together. As another example, litigation alleging infringement of multiple patents gives rise to a binary event because a practitioner can analyze the frequency with which two classifications are litigated together.

Likewise, ternary and higher order events are conceivable and can be analyzed in a manner similar to the lower order events described above, but such analysis would require exponentially larger computer storage capacity and processing power.

Clearly, only the imagination of the practitioner limits the number and nature of unary and/or binary events which can be analyzed using the present method.

Unary events are distinguished by the considered decision of an informed individual which gives rise to the event. For each of these decisions, the frequency for which that decision is made in relation to patent classification X can be determined and analyzed. Some example decisions which give rise to unary events are listed in Table I.

TABLE I

| | The decision . . . |
|---|---|
| (a) | by the examiner to assign a patent to classification X |
| (b) | by the examiner to include in a patent's field of search classification X |
| (c) | by the examiner to cite another patent in classification X |
| (d) | by the inventor to cite another patent in classification X |
| (e) | by the assignee to assert the rights of a patent in classification X |
| (f) | by the assignee who has asserted the rights of a patent in classification X to settle out of court |

TABLE I-continued

| | The decision . . . |
|---|---|
| (g) | by the defendant against whom the rights of a patent in classification X has been asserted to rigorously defend in court |
| (h) | by an IP manager to purchase a patent in classification X |
| (i) | by an IP manager to spend Y dollars to purchase a patent in classification X |
| (j) | by an IP manager to license a patent in classification X |
| (k) | by an IP manager to spend Y dollars to purchase a patent in classification X |
| (l) | by later inventors within patent classification X to cite a patent |
| (m) | by the assignee to dutifully pay the maintenance fees for a patent in classification X |

A binary event would analyze the frequency of an event which is the combination of any two of the above events. For any combination of above events, the frequency of an occurrence involving patent classifications X1 and X2 can be determined and analyzed. Table II below provides some examples.

TABLE II

| Example combination | Explanation |
|---|---|
| (a) and (a) | The decision of the examiner to classify a patent in to classes X1 and X2 |
| (a) and (b) | The decision of the examiner to include class X1 in the field of search list for a patent in class X2 |
| (a) and (f) | The decision of an IP manager for a company with a patent in classification X1 to purchase a patent in classification X2 |
| (e) and (e) | The decision of an assignee to assert the rights of two patents, respectively in classification X1 and X2, in the same lawsuit |
| (e) and (j) | The decision of a later inventor of a patent in classification X1 to cite a litigated patent in classification X2 |

The scope for any of the above patents may also be limited. For example, one may consider only those events occurring within a given time period, or in a particular region, or by a single entity, or any other scope-limiting factor.

Broadly outlined, the method embodied by this invention begins by determining the frequency distribution of the events with respect to the complete patent classification. The method proceeds by distributing this frequency distribution to all layers of the taxonomic structure so that each layer reflects the frequency of events below it. The frequency distribution is normalized and weighted as appropriate. Finally a discriminant function is determined. The result of the discriminate function is an association index. The discriminate function may take the form of a linear or non-linear combination of values. This method is described in greater detail for both unary and binary events below.

DETAILED DESCRIPTION OF THE INVENTION

Figure 1:
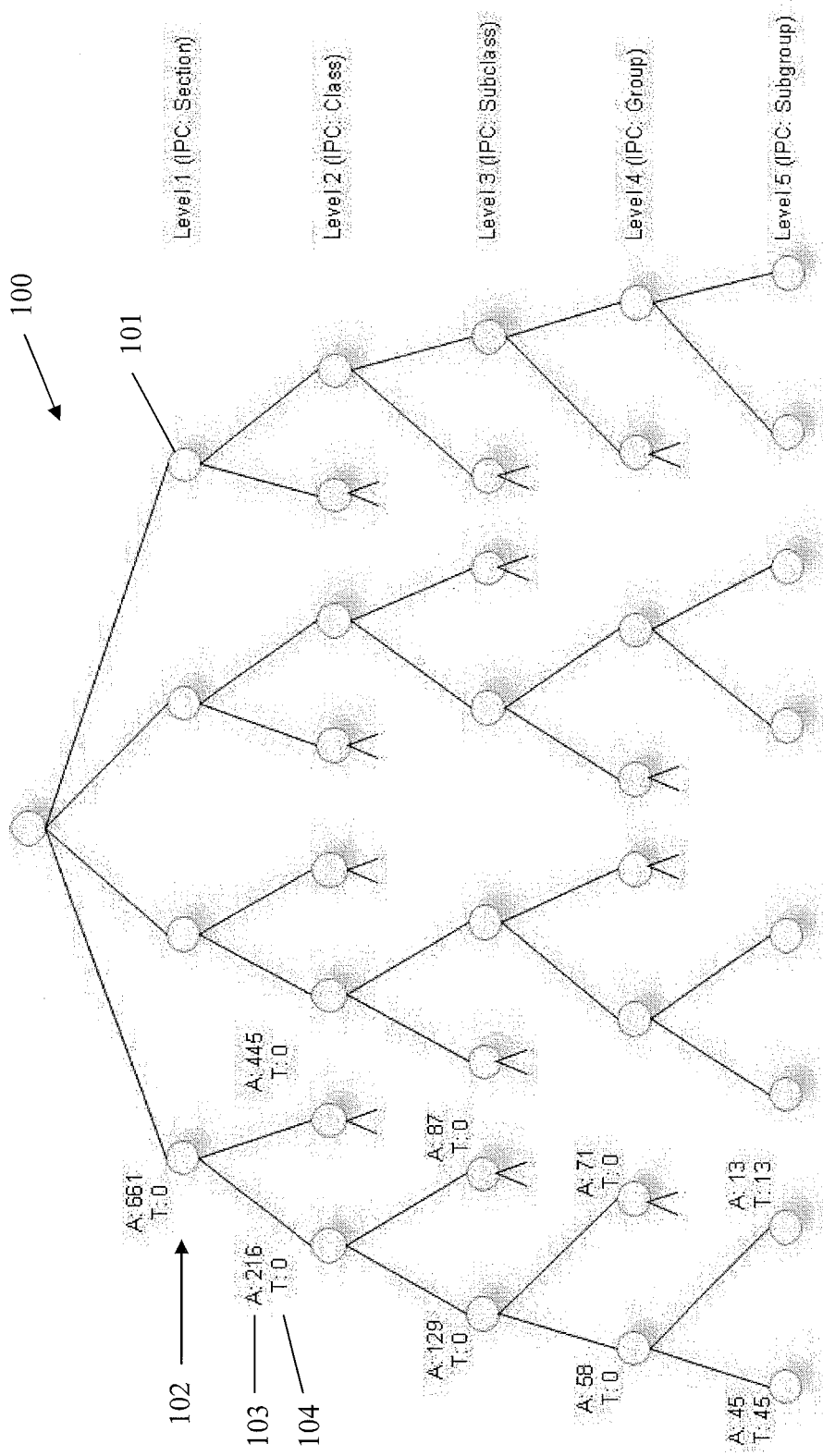
FIG. 1: Representation of the hierarchical structure of the IPC and other similar classification systems.

FIG. 1 represents a simplified hierarchical classification structure 100. While the diagram can be representative any hierarchical classification system, in a preferred embodiment the structure represents the IPC system. In the structure 100, nodes 101 fall on one of five levels 102, one each for the IPC Section, Class, Subclass, Group and Subgroup. For alternative classification systems the number of structure levels 102 will match the number of levels in the classification system.

Nodes 101 represent IPC symbols. For example, a node 101 situated on level 1 (IPC Section) may represent the symbol 'A' (Human Necessities), or 'H' (Electricity) whereas a node 101 situated on level 3 (IPC Subclass) may represent the symbol 'A23C' (Dairy Products).

Each node 101 has a tally 104 and an aggregate tally 103. The tally 104 is the number of documents which have been classified with the symbol represented by the node. The aggregate tally 103 is the number of documents which have been classified with the node 101 symbol and all node symbols that depend from the node 101. Because the IPC system only classifies documents with all five levels (Level 5 nodes only), all tallies 104 for levels 1 through 4 are zero, though this may not be the case in other classification systems.

Figure 2:
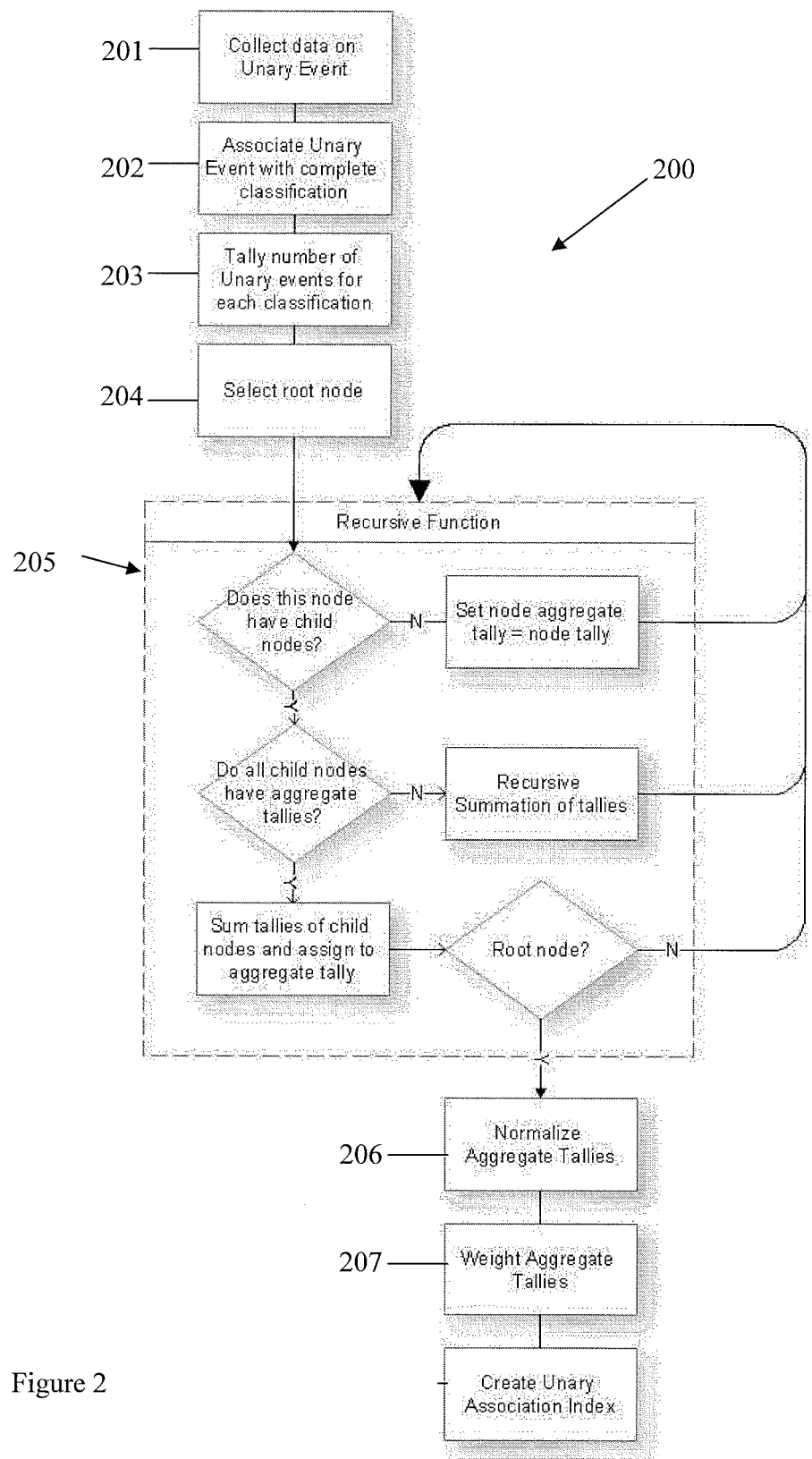
FIG. 2: Flowchart showing the process of creating a unary association index

FIG. 2 shows the process 200 for creating the unary event association index. The process 200 works on a large body of documents (such as the USPTO database) and begins by collecting data 201 on the unary event and associating the data with a classification system 202. This can be done by noting, first, that a unary event involving a document has occurred and, second, the IPC classification of the document. The number of occurrences of this event and the associated document classification is tallied 203.

The process 200 then continues with the selection of a root node 204 whereupon, in a preferred embodiment, it executes a recursive function 205 to set the aggregate tallies 103 for each node. While a recursive function is used in this example, this inventive method is not limited to recursive function. Any programming technique which sets the aggregate tallies for each node 103 is contemplated by this method.

Once the aggregate tallies 103 have been found, the process normalizes the aggregate tallies 206, then multiplies the aggregate tally by one or more weighting factors 207. The step of creating a unary association index 208 involves creating a lookup table wherein a practitioner may retrieve the tally, or some function thereof, associated with the each node 101.

Figure 3:
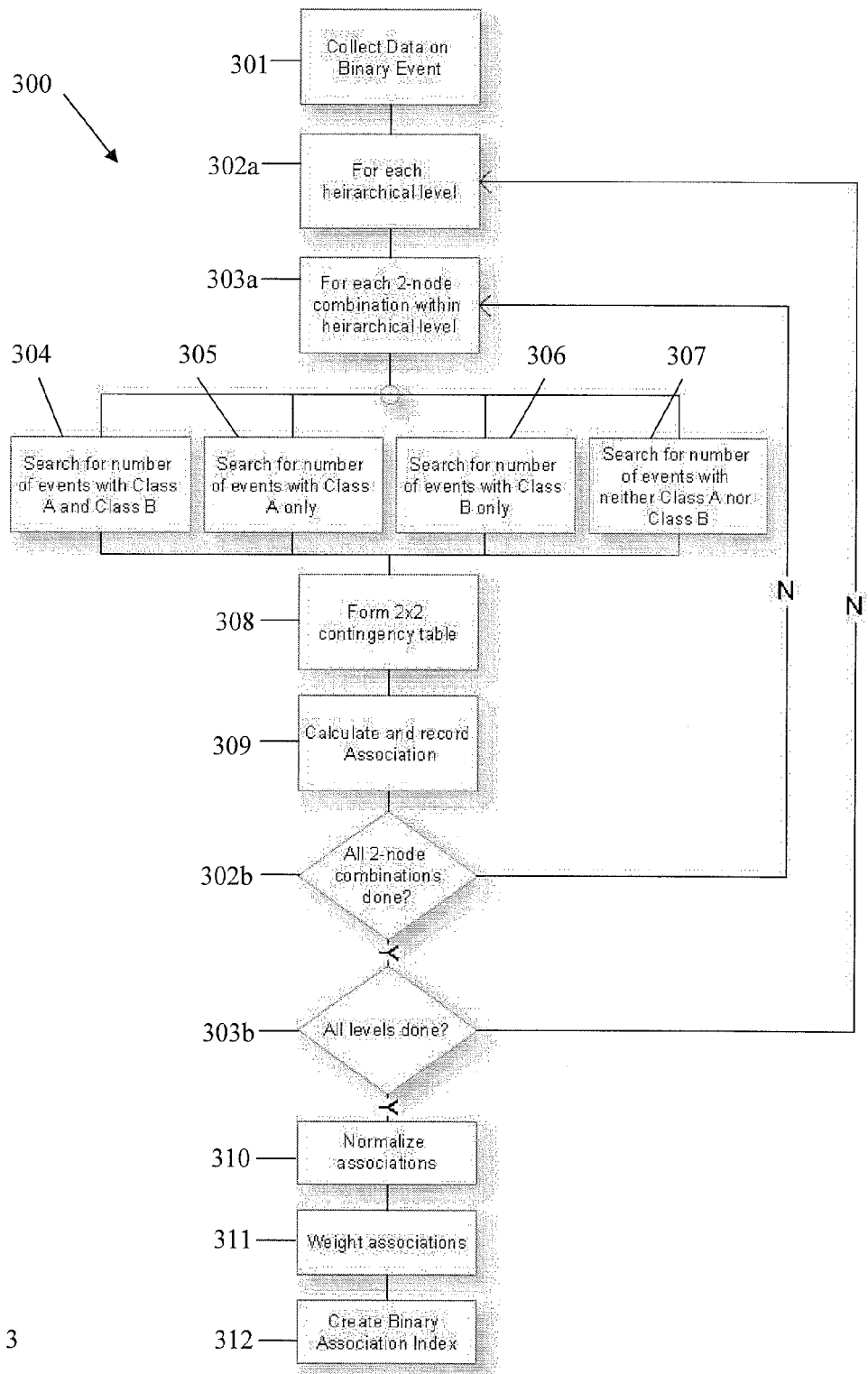
FIG. 3: Flowchart showing the process of creating a binary association index

FIG. 3 shows the process 300 for creating a binary association index. The process begins by collecting data for a binary event involving documents in the body of documents 301. The process will iterate through combinations nodes 101 through two nested loops, 302a, 302b, 303a, 303b.

For each combination of nodes, the process will count the number of events which involve documents classified with each node symbol 304; the number of events involving only documents with the first node symbol 305; the number of events involving only documents with the second node symbol 306; and the number of events with neither node symbol 307.

With the four counts (304, 305, 306, and 307), the process constructs a 2×2 contingency table 308. The contingency table is reduced to a single coefficient called an association 309. The reduction to an association can be accomplished via a statistical method such as Pearson's coefficient of mean-square contingency, Phi; Pearson's contingency coefficient, C; Sakoda's adjusted Pearson's C, C*; Tshuprow's T; Cramer's V; Goodman-Kruskal Lambda; Theil's uncertainty coefficient, U; Cohen's Kappa, Yule's Q and Colignatus' standardized volume ratio.

Once the association for each node pair has been determined, the nodes can be normalized 310, weighted 311 and indexed 312 in a manner similar to the unary association index.

Association Index of Unary Events

FIG. 2 provides the presently preferred embodiment of an algorithm which accomplishes the transformation of a frequency distribution of a unary event to an association index. To distribute a unary event frequency distribution across classifications, the total number of unary events (or a scalar related to the unary events) for each classification is tallied. Within the IPC tree structure, only nodes representing groups and subgroups will have tallies, since these are the only nodes which represent complete patent classifications. It is likely, given the type of unary event and scope of the study, that many classifications will have a total of zero events. An aggregate tally is calculated for each node in the structure, regardless of whether or not the node represents a complete classification. If the node has no child nodes, its aggregate tally is equal to its tally. If the node does have child nodes, the node's aggregate tally is calculated by summing the aggregate tallies of the child nodes, and adding that sum to the node's tally.

For example, if a parent node has a tally of zero and two child nodes with tallies 5 and 7, the aggregate tally for the parent node is 12. If a parent node has a tally of 6 unary events and has two child nodes with tallies of 3 and 9 unary events, then the sum for the parent node will be 18. If a node has a tally of 3 and has no child nodes, then the aggregate tally of the node is 3. In this manner, every node of the taxonomical tree will have an aggregate tally representing the number of unary events within and below it.

At this point in the method, a number of numerical techniques can be employed to normalize the aggregate tallies. Alternatively, there can be no normalization at all. One example method of normalizing the aggregate tallies would be to divide each by the total number of unary events. Another example would be to divide the aggregate tallies for each child node by the aggregate tally of the parent node.

The normalized or non-normalized aggregate tallies may be weighted by multiplying by a constant. This can be done on a level-by-level basis (each node within a level receives the same weighting), on a branch basis (each node within a branch of the tree receives the same weight), a spot basis (the practitioner chooses individual nodes or groups of nodes to receive weighting), or a combination of any of the above.

This allows the practitioner to discount or emphasize the contribution of a node to the association index as needed or desired. This is useful if, for example, the practitioner concludes that a high frequency of a unary event in one patent classification should have a diminished effect on patent classifications which share only a common Section. To accomplish this, the practitioner could multiply the Section sums by a low number and the group sums by a high number. As an alternative example, if the practitioner concludes, for whatever reason, that classes which share a common subclass should have a similar association index, the practitioner could multiply the aggregate sum of that subclass by a larger weight than other nodes. The term 'standard tally' is used to refer to aggregate tallies regardless of whether or nor they have been normalized and/or weighted.

The association index of a unary event for a complete patent classification can now be calculated using the standard tallies of the classifications' node and all of its ancestor nodes. The association index can be a simple summation of standard tallies, or a more complex non-linear equation.

Association Index of Binary Events

The analysis of binary events proceeds in a slightly different manner. FIG. 3 provides the presently preferred embodiment of an algorithm which accomplishes the transformation of a frequency distribution of a binary event to an association index. Whereas in the case of unary events, the present method analyzes and distributes the frequency of an event related to a single class, the binary analysis distributes the frequency of a pair of events. For example, the classification of a patent in to a first class and a second class constitutes a binary event and an analysis of such would first determine the frequency with which the first and second classes are assigned to the same patent. As another example, litigation involving a patent of a first class and a patent of a second class constitutes another kind of binary event and an analysis of such would first determine the frequency with which patents of the first and second class are litigated in the same lawsuit. In reference to tables I and II, it is clear to see that, when compared to an analogous unary event, the number of possible binary events is much greater. For ternary and higher order events, the analysis involves a commensurately larger number of possible events.

While the frequency of these binary events can be represented in many ways, because of the large number of events and because of the paring of patent classes, a contingency table or set of contingency tables is the preferred method. A preferred means of constructing a contingency table would label the rows and columns with node symbols and fill the cell values with the number of binary events involving both the row and column symbols. For example, if the binary event under study is 'co-classification' (an examiner assigns two patent classifications to a document) and a sample of documents contains 65 documents classified with both class A and class B, then the cells at the intersections of the A and B rows and columns (there will be two, corresponding to row A, column B and row B, column A) will have the value 65. A single contingency table can be constructed with the rows and columns containing every node symbol within the IPC hierarchy, regardless of level, or separate contingency tables can be constructed for each level of the tree.

Just like the unary event method, these values can now be normalized and weighted. As such, they are call 'standard cell values'. The construction of the association index, accordingly, takes two complete classifications as input and proceeds by choosing the standard cell values corresponding to the intersection of those complete classification nodes and at least one ancestor node in the table. Again, linear or non-linear equations can be employed using the standard cell values to generate the association index.

A more preferred means of finding the association index for binary events finds the standard cell values by first constructing 2×2 contingency tables for each and every possible pairing of nodes or for a subset of every possible pairing of nodes. Columns would categorize the number of documents containing and not containing the first class, while rows would categorize the number of documents containing and not containing the second class. Standard cell values would then be calculated from these 2×2 contingency tables using any statistical method which quantifies the association between nominal data. These possible methods include, but are not limited to: Pearson's coefficient of mean-square contingency, Phi; Pearson's contingency coefficient, C; Sakoda's adjusted Pearson's C, C*; Tshuprow's T; Cramer's V; Goodman-Kruskal Lambda; Theil's uncertainty coefficient, U; Cohen's Kappa, Yule's Q and Colignatus' standardized volume ratio. Some of the above-mentioned methods are only appropriate for a 2×2 table, while others may be applied to a table of any size. Determination of the association index would proceed as described above.

Litigation Event

Litigation data for a given time period is collected and analyzed. The number of litigation events is determined. Each litigation event is assigned to a patent classification and the total number of litigation events for each patent class is tallied.

For the purposes of this method, a litigation event is defined broadly and may not be synonymous with the event of a single lawsuit alleging infringement. A single lawsuit may produce several litigation events, or it may produce a single event. A single lawsuit involving one or more patents may distribute the number of litigation events over the number of patent classes relevant to the case, or may assign them all to a single patent class. The assignment of litigation events may assign a fractional number of litigation events to a patent class.

The criteria for what constitutes a litigation event may change depending on what type of risk this method is being used to investigate.

For instance, a lawsuit which alleges infringement of four patents may give rise to four litigation events (one for each patent) each associated with the most important patent classification for each patent. Using another set of criteria, the same lawsuit may give rise to a much larger number of litigation events, each associated with patent classes partially or wholly relevant to the four patents. Alternatively, the lawsuit may give rise to a single litigation event.

The invention claimed is:

1. A method of analyzing the relationship of events according to a taxonomic structure having separate predefined layers in a hierarchical classification system comprising the steps of:
   determining the frequency distribution of the events with respect to the classification system; and,
   distributing the frequency distribution to all layers of the taxonomic structure so that each layer reflects the frequency of events below it; and,
   normalizing and weighting the frequency distribution with respect to all events either unary or binary or both; and,
   determining a discriminate function which may take the form of a linear or non-linear combination of values useful in creating an association index.

* * * * *